United States Patent Office 2,966,410
Patented Dec. 27, 1960

2,966,410

SHORTENING EMULSIFIERS AND METHOD OF USING SAME

Stephen S. Chang, Park Forest, Forrest L. De Vore, Bloomington, and Marvin A. Friedman, Park Forest, Ill., assignors to Swift & Company, Chicago, Ill., a corporation of Illinois No Drawing. Filed Dec. 3, 1957, Ser. No. 700,291

14 Claims. (Cl. 99—118)

The present invention relates to improved agents for icing shortenings. More particularly, the subject invention is directed to diglycerides of certain fatty and hydroxy acids and their use as emulsifiers in icing shortenings.

Several years ago it was discovered that so-called "super glycerinated" shortenings containing monoglycerides and diglycerides produced cakes of superior grain and texture. More recently, it has been found that even better cakes result when diglyceride materials prepared from glycerine, higher fatty acids, and lower hydroxy acids are used as shortening agents. Compounds of this type are described in the United States patent to Iveson et al., No. 2,690,971, wherein the lower hydroxy acids are described as organic mono-hydroxy carboxylic acids of not over six carbon atoms having the general formula R—CHOH—COOH wherein R represents hydrogen or a hydrocarbon group having one to four carbon atoms.

In addition to their use in cakes, large quantities of emulsifiers or shortening agents are consumed in making icings for various pastry products. Icings usually consist of fat, powdered sugar, salt, milk, and flavoring and have considerable amounts of air beaten into the fat. Those icing materials which are placed between layers of a cake or are incorporated within a pastry product, are often designated as cream fillers. Generally, a cream filler icing contains more fat and more water than an icing which is used as a coating for pastries. The following formulas are typical of a cream filler icing and a coating icing:

| Item | Cream Filler Icing | Coating Icing |
|---|---|---|
| Powdered Sugar | 3 lbs. | 3 lbs. |
| Fat | 1½ lbs. | 14 oz. |
| Milk Solids | 6 oz. | 3 oz. |
| Salt | 0.5 oz. | 0.25 oz. |
| Water | 1.5 lbs. | 0.8 oz. |
| Vanilla | 0.5 oz. | 0.25 oz. |

The particular ingredients used, as well as the percentage of each material, depend on individual preference and the type of cake or pastry being prepared. In the above formula, "fat" includes the shortening agent. The amount of emulsifier added to the icing is based on a certain percentage of oil present in the product.

Although "super glycerinated" emulsifiers and emulsifiers of the Iveson et al. type have been added to icings to increase their volume and produce a smoother product, they have not proven to be entirely satisfactory for these purposes.

It is an object of the present invention, therefore, to prepare new shortening agents which will improve the appearance and volume of cake icings.

Another object of the present invention is to provide a method of preparing new and improved icing shortenings.

Other objects of the present invention will become readily apparent to one skilled in the art from the following detailed description of the invention.

In general, the present invention comprises the discovery that the use of myristic acid rather than other fatty acids in preparing shortening agents of the Iveson et al. type markedly improves their performance in icing shortenings. More specifically, it has been found that where myristic acid comprises at least about 60% of the fatty acid material used in preparing lactylated mono-fatty acid esters, that these materials will produce superior icing volumes and improve the appearance and texture of the product.

The following examples are illustrative of the present invention:

Example I

One mole of myristic acid, one mole of lactic acid, and one mole of glycerin were mixed in a vessel fitted with a stirrer and a reflux condenser and were heated to 185° C. The reactants were kept at this temperature for 6½ hours, during which time the material was constantly agitated. A current of carbon dioxide was bubbled through the molten materials for the first 5 hours of the reaction. A vacuum of 15–21 inches was applied to the vessel during the last 2 hours of this 5 hour period. A 1 mm. vacuum was then applied and the product was steam stripped at 185° C. for 1½ hours.

The addition of up to 10% of the product prepared as shown above to a hydrogenated vegetable fat gave the following results when the fat was incorporated in a cream filler icing:

| Icing Number | Percent Emulsifier | Specific Gravity of Icing |
|---|---|---|
| 1 | 0 | 0.630 |
| 2 | 3 | 0.615 |
| 3 | 5 | 0.590 |
| 4 | 7 | 0.565 |
| 5 | 8 | 0.525 |
| 6 | 10 | 0.490 |

Example II

In the following table, Emulsifier A was prepared in accordance with the Iveson, et al., teaching, using 80% palmitic acid and 20% myristic acid as the fatty acid component, and Emulsifier B was prepared as described in Example I:

| Emulsifier | Specific Gravity of Cream Filler Icing |
|---|---|
| 5% Monoglycerides | 0.700 |
| 5% Monoglycerides+5% Emulsifier A | 0.715 |
| 5% Monoglycerides+10% Emulsifier A | 0.730 |
| 5% Monoglycerides+20% Emulsifier A | 0.740 |
| 5% Monoglycerides+5% Emulsifier B | 0.550 |
| 5% Monoglycerides+10% Emulsifier B | 0.490 |

It is apparent from the data given in Examples I and II that the use of myristic acid as the predominant fatty acid component of the emulsifier lowers the specific gravity of the icing and correspondingly increases the icing volume.

Example III

A series of emulsifiers was prepared as described in Example I from glycerin, lactic acid, and from various proportions of myristic and palmitic acids. The following table sets forth a comparison of the effectiveness of these materials.

| Percent of Myristic Acid | Percent of Palmitic Acid | Monoglycerides | Specific Gravity of Icing |
|---|---|---|---|
| 100 | 0 | 2½ | 0.440 |
| 90 | 10 | 2½ | 0.450 |
| 80 | 20 | 2½ | 0.460 |
| 70 | 30 | 2½ | 0.475 |
| 60 | 40 | 2½ | 0.485 |
| 0 | 100 | 2½ | 0.615 |

*Example IV*

In a similar comparative test, a group of emulsifiers was prepared as described in Example I from glycerin, lactic acid and from various proportions of myristic and stearic acids. The results of the test were as follows:

| Percent of Myristic Acid | Percent of Stearic Acid | Monoglycerides | Specific Gravity of Icing |
|---|---|---|---|
| 100 | 0 | 2½ | 0.440 |
| 90 | 10 | 2½ | 0.485 |
| 80 | 20 | 2½ | 0.525 |
| 60 | 40 | 2½ | 0.535 |
| 50 | 50 | 2½ | 0.600 |

The tables in Examples III and IV again demonstrate that shortening agents containing less than 60% myristic acid are markedly inferior to the emulsifiers of the present invention.

*Example V*

The results of a test showing the comparative value of lactylated monoglycerides of (1) myristic acid, (2) palmitic acid, and (3) stearic acid as icing emulsifiers are set forth below. The additives were used at a 4% level based on the weight of the oil in the icing.

| Base Oil | Acid Used in Emulsifier | Monoglycerides, percent | Specific Gravity of Icing |
|---|---|---|---|
| Animal Fat | Myristic | | 0.730 |
| Do | Palmitic | | 1.025 |
| Do | Stearic | | 1.095 |
| Do | | 2½ | 1.020 |

*Example VI*

The following table shows the effectiveness of various amounts of an emulsifier prepared as described in Example I when used in an icing shortening:

| Base Oil | Amount of Emulsifier, percent | Specific Gravity of Icing |
|---|---|---|
| Vegetable Oil Shortening | 0 | 0.630 |
| Do | 3 | 0.615 |
| Do | 5 | 0.590 |
| Do | 6 | 0.565 |
| Do | 7 | 0.540 |
| Do | 8 | 0.525 |
| Do | 10 | 0.490 |
| Animal Oil Shortening +3% Monoglycerides | 0 | 0.645 |
| Do | 5 | 0.565 |
| Animal and Vegetable Oil Shortening +5% Monoglycerides | 0 | 0.635 |
| Do | 2 | 0.630 |
| Do | 3 | 0.595 |
| Do | 4 | 0.580 |
| Do | 5 | 0.565 |

Although our preferred product is prepared from equal molar amounts of fatty acid, hydroxy acid, and glycerin, it is possible to use more or less than one mole of hydroxy acid and still produce an acceptable although somewhat inferior emulsifier. Similarly, more or less than one mole of glycerin and/or fatty acid could be used although this again would produce a somewhat inferior product.

When a one-to-one-to-one mole ratio is used, we obtain about 10% triglyceride material, 15% monoglyceride material, and 75% diglyceride material. The diglyceride portion is composed mainly of lactomyristate where lactic acid and myristic acid are employed, although some dimyristin would also be formed.

The subject icing shortening additives could be prepared at temperatures lower than the usual 185° C. although this would require longer reaction times. We have conducted tests, for example, wherein the product was made at 170° C. as well as 185° C. At the higher temperature the reaction was run under a $CO_2$ protective blanket for 3 hours and then under a vacuum for 2 additional hours. At 170° C. the reaction required 4 hours under the $CO_2$ blanket followed by 3 hours under the vacuum.

In our preferred embodiment the reaction is conducted in a closed vessel. Carbon dioxide or another inert gas is passed continuously through the mixture to (1) carry out $H_2O$, (2) to prevent oxidative deterioration, and (3) to inhibit discoloration. Following the completion of the reaction, the product is steam stripped to remove all materials having a vapor pressure higher than the desired product. Such materials would include free fatty acids, glycerin, hydroxy acids, and condensation products of hydroxy acids and of hydroxy acids and glycerin. Although all of the tests set forth above were run using lactic acid as the hydroxy acid, other similar materials such as hydroxy butyric acid, hydroxy valeric acid, etc., could also be employed in preparing the product.

As was indicated in the examples, the preferred compound of the present invention contains at least about 80% myristic acid as the fatty acid component of the diglyceride. It has been found, however, that materials containing from about 60% to 100% myristic acid show a significant improvement over other shortening agents when used as additives in icing shortenings. If desired, these materials can be used along with monoglycerides or other emulsifiers. It is desirable in most cases to add to the shortening about 1% to about 10% based on the weight of the shortening of the reaction product.

Obviously, many modifications and variations of the invention as hereinbefore set forth may be made without departing from the spirit and scope thereof, and therefore only such limitations should be imposed as are indicated in the appended claims.

We claim:

1. An improved shortening for use in icings which comprises: a shortening selected from the group consisting of vegetable fats, meat fats, and mixtures thereof and at least about 1.0% of the diglyceride reaction products of glycerin, higher fatty acids at least 60% by weight of which is myristic acid, and an alkyl monohydroxy monocarboxylic acid of from 2 to 6 carbon atoms, at least about 50% of said diglyceride reaction products having a monohydroxy, monocarboxylic acid radical of from 2 to 6 carbon atoms and a higher fatty acid radical.

2. An improved shortening for use in icings which comprises: a shortening selected from the group consisting of vegetable fats, meat fats, and mixtures thereof and at least about 1.0% of the diglyceride reaction products of 1 molar equivalent of glycerin, 1 molar equivalent of higher fatty acids at least 60% by weight of which is myristic acid, and 1 molar equivalent of an alkyl monohydroxy monocarboxylic acid of from 2 to 6 carbon atoms.

3. An improved shortening for use in icings as in claim 1 wherein the monohydroxy monocarboxylic acid of from 2 to 6 carbon atoms is lactic acid.

4. An improved shortening for use in icings as in claim 2 wherein the monohydroxy carboxylic acid is lactic acid.

5. An improved shortening agent for use in icings which comprises: the reaction products of glycerin, higher fatty acids at least 60% by weight of which is myristic acid, and an alkyl monohydroxy monocarboxylic acid of from 2 to 6 carbon atoms, at least about 50% of said reaction products having a monohydroxy, monocarboxylic acid radical of from 2 to 6 carbon atoms and a higher fatty acid radical.

6. An improved shortening agent for use in icings which comprises: the reaction products of 1 molar equivalent of glycerin, 1 molar equivalent of higher fatty acids at least 60% by weight of which is myristic acid, and 1 molar equivalent of an alkyl monohydroxy monocarboxylic acid of from 2 to 6 carbon atoms.

7. An improved shortening agent for use in icings as in claim 5 wherein the monohydroxy monocarboxylic acid of from 2 to 6 carbon atoms is lactic acid.

8. An improved shortening agent for use in icings as in claim 6 wherein the monohydroxy carboxylic acid is lactic acid.

9. A method of improving the shortening qualities of a shortening selected from the group consisting of vegetable fats, meat fats, and mixtures thereof which comprises: adding to said shortening a minor amount of the diglyceride reaction products of glycerin, higher fatty acids at least 60% by weight of which is myristic acid, and an alkyl monohydroxy monocarboxylic acid of from 2 to 6 carbon atoms, at least about 50% of said diglyceride reaction products having a monohydroxy, monocarboxylic acid radical of from 2 to 6 carbon atoms and a higher fatty acid radical.

10. A method of improving the shortening qualities of a shortening selected from the group consisting of vegetable fats, meat fats, and mixtures thereof which comprises: adding to said shortening a minor amount of the reaction products of 1 molar equivalent of glycerin, 1 molar equivalent of higher fatty acids at least 60% by weight of which is myristic acid, and 1 molar equivalent of an alkyl monohydroxy monocarboxylic acid of from 2 to 6 carbon atoms.

11. A method of improving the shortening qualities of a shortening selected from the group consisting of vegetable fats, meat fats, and mixtures thereof which comprises: adding to said shortening from about 1 to about 10% by weight of the diglyceride reaction products of glycerin, higher fatty acids at least 60% by weight of which is myristic acid, and an alkyl monohydroxy monocarboxylic acid from 2 to 6 carbon atoms, at least about 50% of said digylceride reaction products having a monohydroxy, monocarboxylic acid radical of from 2 to 6 carbon atoms and a higher fatty acid radical.

12. A method as in claim 9 wherein the monohydroxy monocarboxylic acid is lactic acid.

13. A method as in claim 10 wherein the monohydroxy monocarboxylic acid is lactic acid.

14. A method as in claim 11 wherein the monohydroxy monocarboxylic acid is lactic acid.

References Cited in the file of this patent

UNITED STATES PATENTS 2,480,332    Little _____ Aug. 30, 1949